United States Patent
Kao et al.

(10) Patent No.: US 6,999,251 B2
(45) Date of Patent: Feb. 14, 2006

(54) APPARATUS FOR USE IN FORMING COLORED SEGMENTS OF A COLOR FILTER

(75) Inventors: Po-Sung Kao, Taichung (TW);
Wen-Hao Huang, Taichung (TW);
Yan-Hong Liu, Taichung (TW);
Yang-Sang Tien, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 88 days.

(21) Appl. No.: 10/826,944

(22) Filed: Apr. 16, 2004

(65) Prior Publication Data

US 2005/0122485 A1    Jun. 9, 2005

(30) Foreign Application Priority Data

Dec. 5, 2003    (TW) .............................. 92134376 A

(51) Int. Cl.
*G02B 5/22* (2006.01)
(52) U.S. Cl. .................. 359/891; 359/885; 348/743; 356/418; 353/84; 362/293; 427/162
(58) Field of Classification Search ................ 359/885, 359/889, 891, 892; 348/743; 356/418; 353/84; 362/293
See application file for complete search history.

(56) References Cited

U.S. PATENT DOCUMENTS

| | | | |
|---|---|---|---|
| 5,868,482 A | 2/1999 | Edlinger et al. | |
| 6,876,505 B2 * | 4/2005 | Niwa | 359/891 |
| 2004/0084397 A1 * | 5/2004 | Kamei et al. | 216/5 |
| 2004/0246218 A1 * | 12/2004 | Takao | 345/88 |
| 2005/0030659 A1 * | 2/2005 | Asakawa | 359/892 |

* cited by examiner

*Primary Examiner*—Leonidas Boutsikaris
(74) *Attorney, Agent, or Firm*—Townsend and Townsend and Crew LLP

(57) ABSTRACT

An apparatus for use in forming colored segments of a color filter on a substrate includes at least one pair of first and second masking plates, and a securing device for securing together the first and second masking plates and the substrate. The substrate has an outer periphery and a first surface which is adapted to be coated with the colored segments. The first masking plate overlies the first surface, and has a first outer periphery corresponding to the outer periphery of the substrate, and at least one first cutout part to expose a portion of the first surface. The second masking plate has a second outer periphery corresponding to the first outer periphery, and at least one second cutout part corresponding to the first cutout part.

20 Claims, 9 Drawing Sheets

APPARATUS FOR USE IN FORMING COLORED SEGMENTS OF A COLOR FILTER

CROSS-REFERENCE TO RELATED APPLICATION

This application claims priority of Taiwanese Application No. 092134376, filed on Dec. 5, 2003.

BACKGROUND OF THE INVENTION

1. Field of the Invention

The invention relates to the formation of color filters, more particularly to an apparatus for making a color filter.

2. Description of the Related Art

Referring to FIGS. 1 to 3, a conventional optical projection device, as disclosed in U.S. Pat. No. 5,868,482, is shown to include a color wheel assembly 1, a light source 2, a picture generating device 3, an optical projection system 4, and a screen 5. The color wheel assembly 1 has a motor 101, a carrier 102 mounted on a shaft of the motor 101, an adhesive layer 103 coated on the carrier 102, three sector-shaped filter segments 104 that are adhered to the adhesive layer 103 and that cooperate to form a ring shape, and a retaining ring 105 for retaining the filter segments 104 on the carrier 102. Accordingly, when the motor 101 rotates the carrier 102, light beams projected from the light source 2 can pass through the filter segments 104 in sequence, and to the picture generating device 3, after which, the picture produced by the picture generating device 3 is projected on the screen 5 through the optical projection system 4.

In general, the rotational speed provided by the motor 101 for the filter segments 104 is related to the picture refresh rate, and is in a range of several thousand revolutions per minute. As such, during rotation, the filter segments 104 can encounter considerable centrifugal forces of up to a thousand times greater than the weight thereof.

Referring again to FIG. 3, the filter segments 104 are cut from three individual plates 6, which are respectively coated with different colors, such as red (R), green (G), and blue (B), and which are then adhered to the carrier 102 (see FIG. 2) so as to form a ring shape.

Since the filter segments 104 are not formed integrally, during high-speed rotation, problems of imbalance due to non-uniform tolerable strengths can occur. Furthermore, since the filter segments 104 have to be cut from three separate plates 6, which are colored beforehand and which are thereafter adhered to the carrier 102, not only is the production both troublesome and inconvenient, control of the stability and precision of the filter segments 104 is also difficult.

SUMMARY OF THE INVENTION

Therefore, the object of the present invention is to provide an apparatus for use in forming colored segments on different positions of a unitary color filter with precision.

According to this invention, an apparatus for use in forming colored segments of a color filter on a substrate comprises at least one pair of first and second masking plates, and a securing device. The substrate has a central slot, an outer periphery around the central slot, a first surface which extends between the central slot and the outer periphery and which is coated with the colored segments, and a second surface opposite to the first surface. The first masking plate is adapted to overlie the first surface, and has a first positioning hole, a first outer periphery corresponding to the outer periphery of the substrate, and at least one first cutout part adapted to expose a portion of the first surface. The second masking plate has a second positioning hole, a second outer periphery corresponding to the first outer periphery, and at least one second cutout part corresponding to the first cutout part. The securing device is for securing together the first and second masking plates and the substrate. The securing device passes through the central slot and the first and second positioning holes, and aligns the first and second cutout parts. The second masking plate presses the first masking plate tightly against the substrate.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
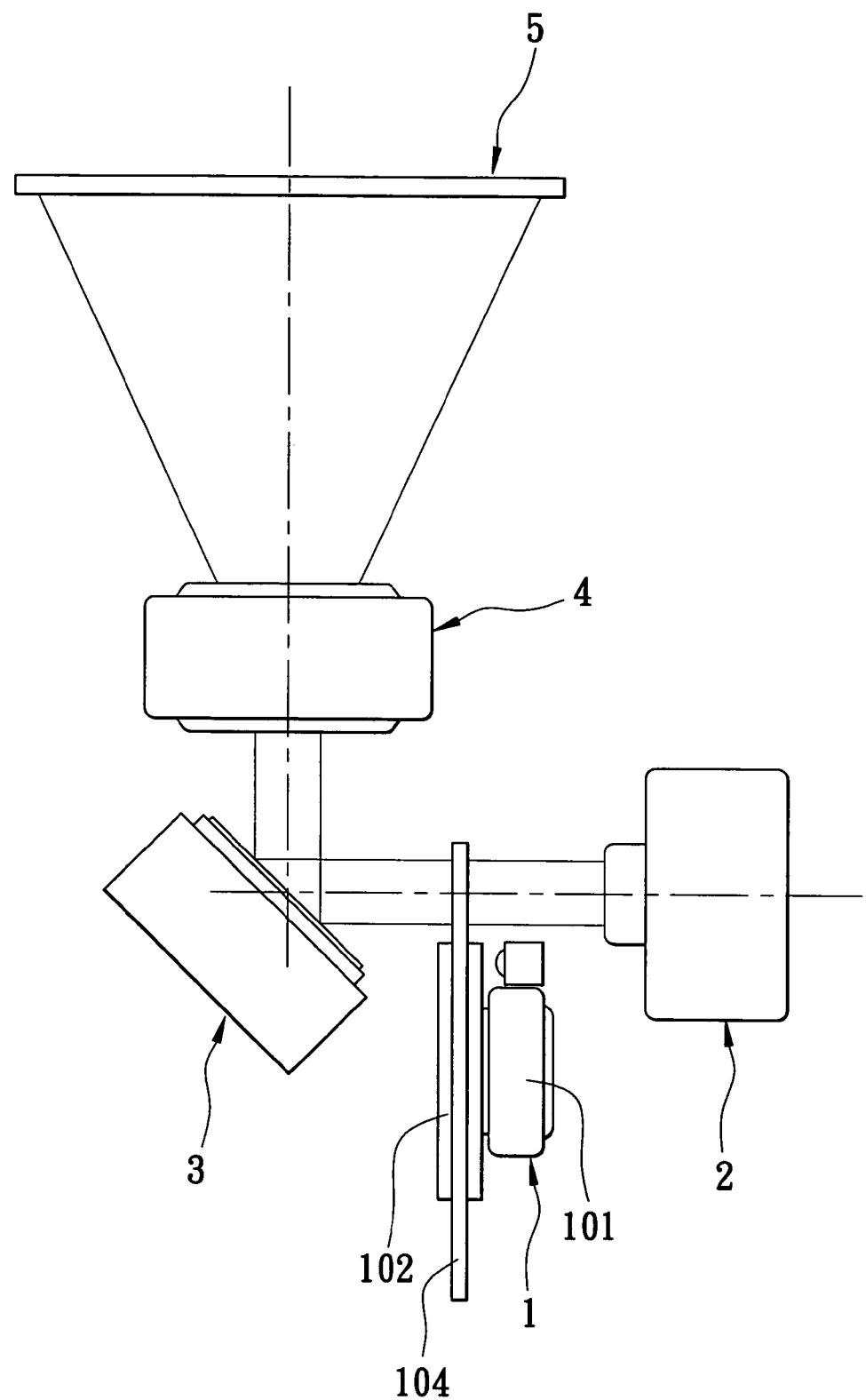
FIG. 1 is a schematic view of a conventional optical projection device disclosed in U.S. Pat. No. 5,868,482.
Figure 2:
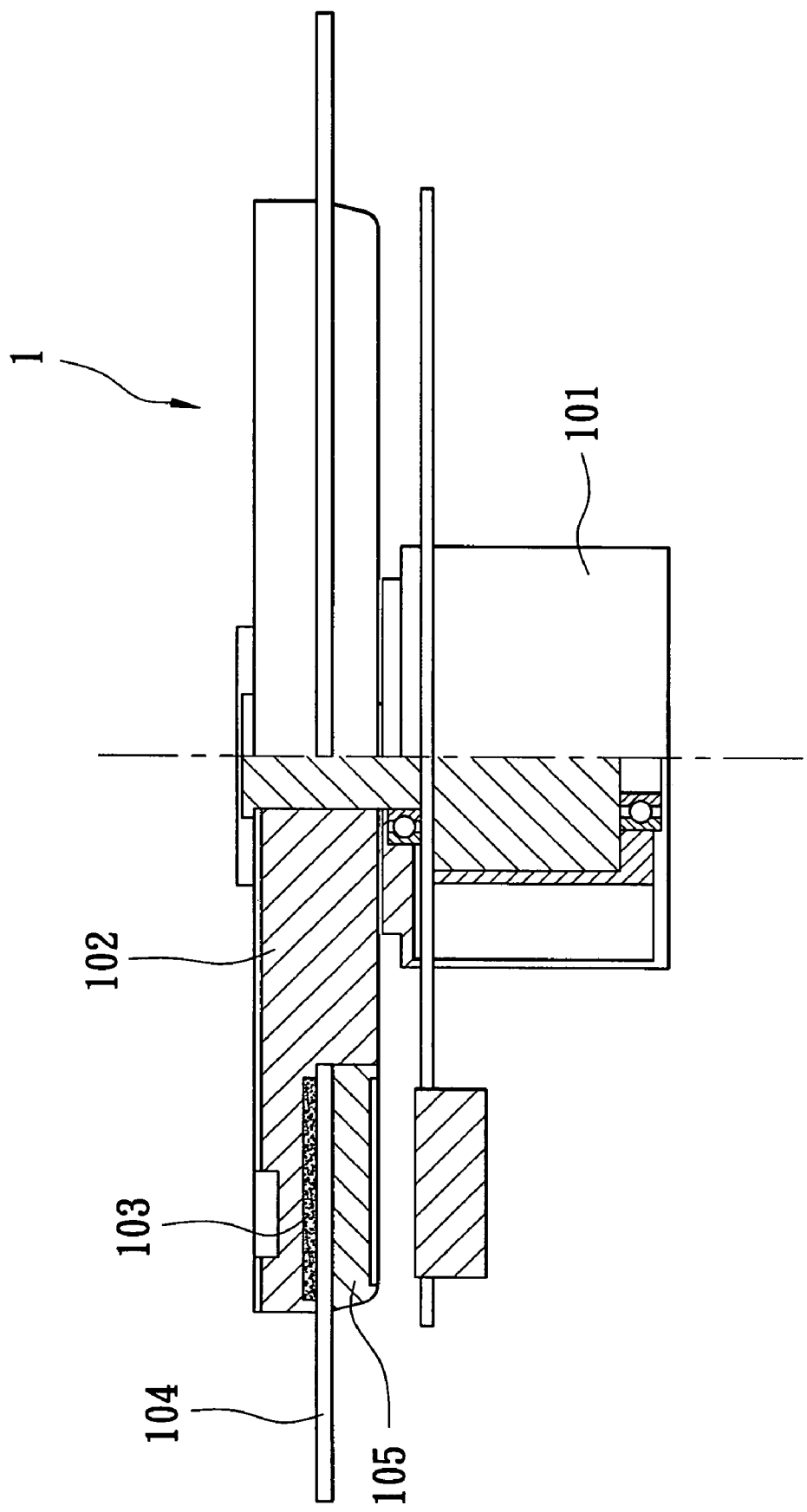
FIG. 2 is a partly sectional view of a color wheel assembly of the conventional optical projection device.
Figure 3:
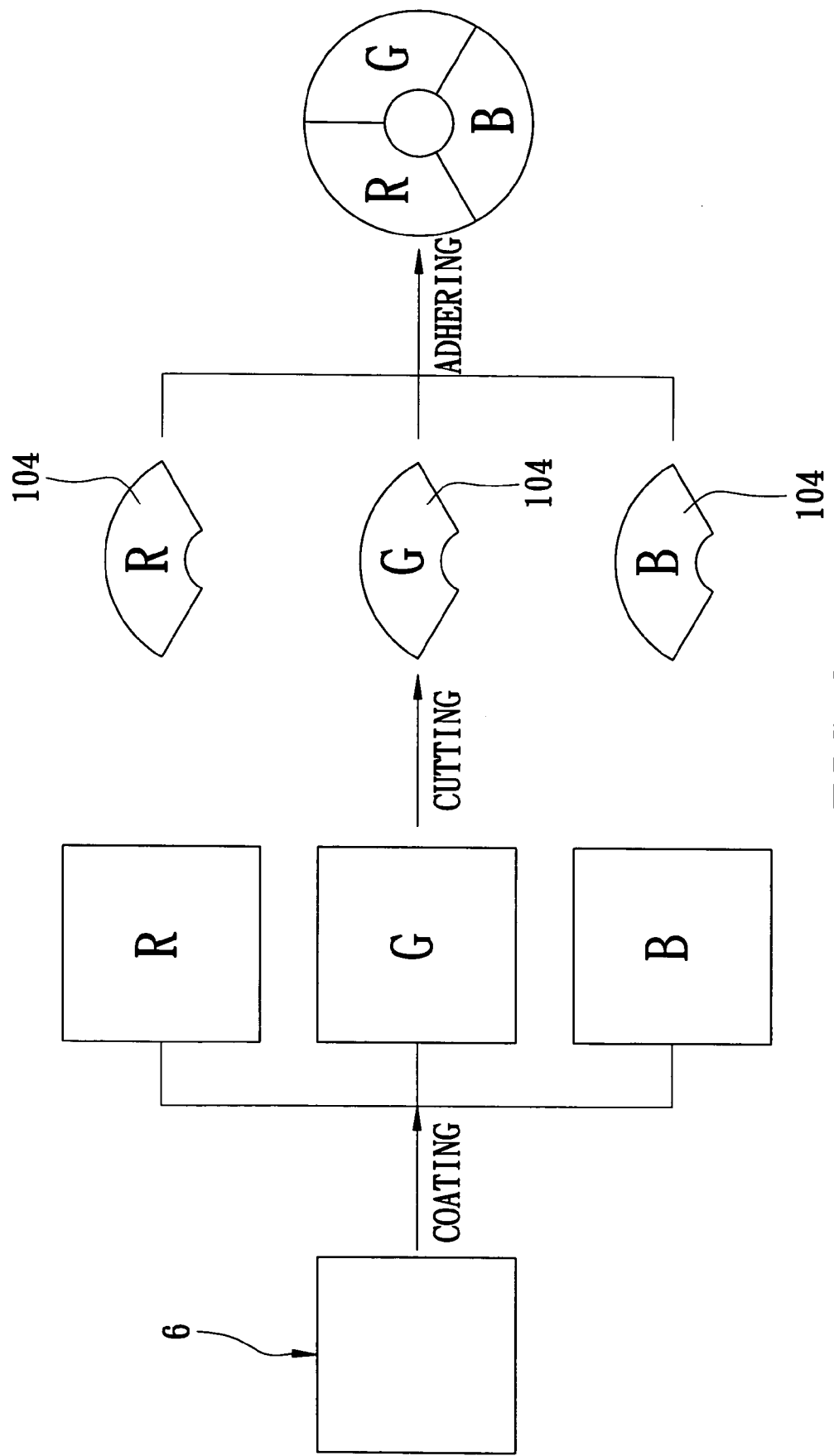
FIG. 3 illustrates consecutive steps for forming a color filter of the conventional color wheel assembly.

Referring to FIGS. 4 to 9, the preferred embodiment of an apparatus for forming colored segments 131, 132, 133 (see FIGS. 6 to 9) of a color filter 400 (see FIG. 9) on a substrate 100 according to the present invention is shown to comprise three pairs of first and second masking plates 50, 60, 510, 610, 520, 620, a press plate 200, and a securing device 300.

The substrate 100 has a central slot 110, an outer periphery 120 around the central slot 110, a first surface 130 extending between the central slot 110 and the outer periphery 120, and a second surface 140 opposite to the first surface 130.

Each of the first masking plates 50, 510, 520 has a first positioning hole 51, 511, 521, a first outer periphery 52, 512, 522 corresponding to the outer periphery 120 of the substrate 100, and two diametrically opposite first cutout parts 53, 513, 523 that are offset radially from the first positioning hole 51, 511, 521 and that expose portions of the first surface 130 of the substrate 100. Each of the first cutout parts 53, 513, 523 is formed as a truncated sector shape. The first masking plate 50 further has a plurality of annularly spaced-apart graduation holes 54 surrounding the first positioning hole 51.

In this embodiment, the first masking plates 50, 510, 520 are made of stainless steel, and are made by chemical etching. Each of the first masking plates 50, 510, 520 has a thickness ranging from 0.1 mm~0.3 mm and a surface roughness of less than 0.02 μm, and is flexible. Each cutout part 53, 513, 523 of the first masking plates 50, 510, 520 subtends an angle at the center of a respective one of the first masking plates 50, 510, 520. The tolerance of the angle is ±0.1°.

Each of the second masking plates 60, 610, 620 is rigid, and has a second positioning hole 61, 611, 621, a second outer periphery 62, 612, 622 corresponding to the outer periphery 120 of the substrate 100, and two diametrically opposite second cutout parts 63, 613, 623 that are offset radially from the second positioning hole 61, 611, 621 and that correspond to and that are aligned with the first cutout parts 53, 513, 523. Each of the second cutout parts 63, 613, 623 is also formed as a truncated sector shape. The second masking plate 60 further has a plurality of slots 64 to be in alignment with the graduation holes 54 in the first masking plate 50.

The press plate 200 has an axial hole 21 and an outer periphery 22 corresponding to the outer periphery 120 of the substrate 100.

The securing device 300 is used for securing together the first and second masking plates 50, 510, 520, 60, 610, 620 and the substrate 100. The securing device 300 includes a positioning post 10, a first packing ring 30, a first fastening member, a second packing ring 70, and a second fastening member.

The positioning post 10 has a first positioning section 11 and a second positioning section 12 extending axially and outwardly from the first positioning section 11. The first positioning section 11 includes an internally threaded hole 111, and four angularly spaced-apart positioning protrusions 112 that extend outwardly and radially from the first positioning section 11. The second positioning section 12 includes an externally threaded part 121, and four angularly spaced-apart aligning protrusions 122 that extend outwardly and radially from the second positioning section 12 and that are connected integrally and respectively to the positioning protrusions 112. In this embodiment, the second positioning section 12 has an asymmetric cross-section, wherein the length of one of the aligning protrusions 122 is different from those of the other three aligning protrusions 122. The second positioning section 12 is so designed to facilitate identification of the first and second masking plates 50, 510, 520, 60, 610, 620 and to prevent errors when aligning the first and second masking plates 50, 510, 520, 60, 610, 620.

Since the aligning protrusions 122 are longer in radial directions than the respective positioning protrusions 112, they each provide an abutment surface 123 extending transversely and outwardly from the second positioning section 12 adjacent to the first positioning section 11. A groove 1121 (see FIG. 5) is formed between each positioning protrusion 112 and the abutment surface 123 of a respective one of the aligning protrusions 122. When the first positioning section 11 of the positioning post 10 passes through the central slot 110 in the substrate 100, the substrate 100 is sleeved on the first positioning section 11, and the first surface 130 abuts against the abutment surfaces 123 of the aligning protrusions 122.

Figure 5:
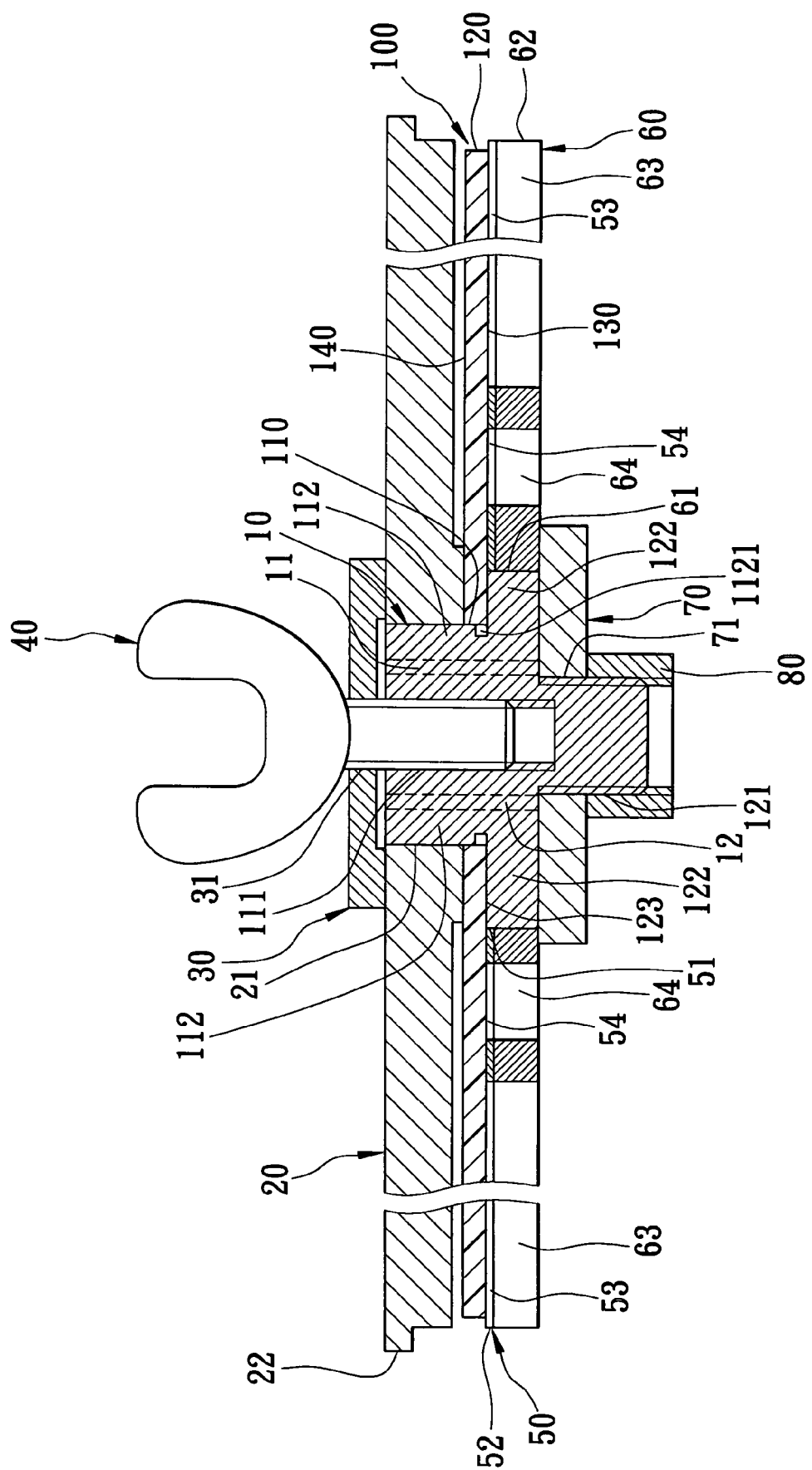
FIG. 5 is an assembled sectional view of the preferred embodiment.

Each of the first positioning holes 51, 511, 521 in the first masking plates 50, 510, 520 has a cross-section substantially corresponding to that of the second positioning section 12 of the positioning post 10. When the externally threaded part 121 of the second positioning section 12 passes through the first positioning hole 51, 511, 521 in one of the first masking plates 50, 510, 520, which in this case the first masking plate 50 is cited and is illustrated in FIG. 5, the first masking plate 50 is sleeved on the aligning protrusions 122 of the second positioning section 12, and abuts against the first surface 130 of the substrate 100.

Each of the second positioning holes 61, 611, 621 in the second masking plates 60, 610, 620 has a cross-section substantially corresponding to that of the second positioning section 12 of the positioning post 10. When the externally threaded part 121 of the second positioning section 12 passes through the second positioning hole 61, 611, 621 in one of the second masking plates 60, 610, 620, which in this case the second masking plate 60 is cited and is illustrated in FIG. 5, the second masking plate 60 is sleeved on the aligning protrusions 122 of the second positioning section 121, and abuts against the first masking plate 50.

The axial hole 21 in the press plate 200 has a cross-section substantially corresponding to that of the first positioning section 11 of the positioning post 10. When the first positioning section 11 passes through the axial hole 21, the press plate 200 is sleeved on the first positioning section 11, and abuts against the second surface 140 of the substrate 100.

The first fastening member, in this embodiment, is a wing bolt 40. The bolt 40 engages the internally threaded hole 111 in the first positioning section 11 so as to press the press plate 200 against the second surface 140 of the substrate 100.

The first packing ring 30 is disposed between the press plate 200 and the bolt 40, and has a central screw hole 31. The bolt 40 is passed through the screw hole 31, and engages threadedly the internally threaded hole 111 in the first positioning section 11, thereby pressing the first packing ring 30 toward the substrate 100 so that the press plate 200 is pressed against the second surface 140 of the substrate 100, and the first surface 130 of the substrate 100 is pressed tightly against the abutment surfaces 123 of the aligning protrusions 122 of the positioning post 10.

The second fastening member, in this embodiment, is a nut 80. The nut 80 is engaged threadedly to the externally threaded part 121 of the second positioning section 12 of the positioning post 10 so as to press the first masking plate 50 against the first surface 130 of the substrate 100.

The second packing ring 70 is disposed between the second masking plate 60 and the nut 80, and has a central screw hole 71. When the nut 80 and the second packing ring 70 are sleeved onto the externally threaded part 121 of the second positioning section 12 of the positioning post 10, the nut 80 presses the second packing ring 70 toward the substrate 100 so that the second masking plate 60 presses the first masking plate 50 tightly against the first surface 130 of the substrate 100.

Figure 4:
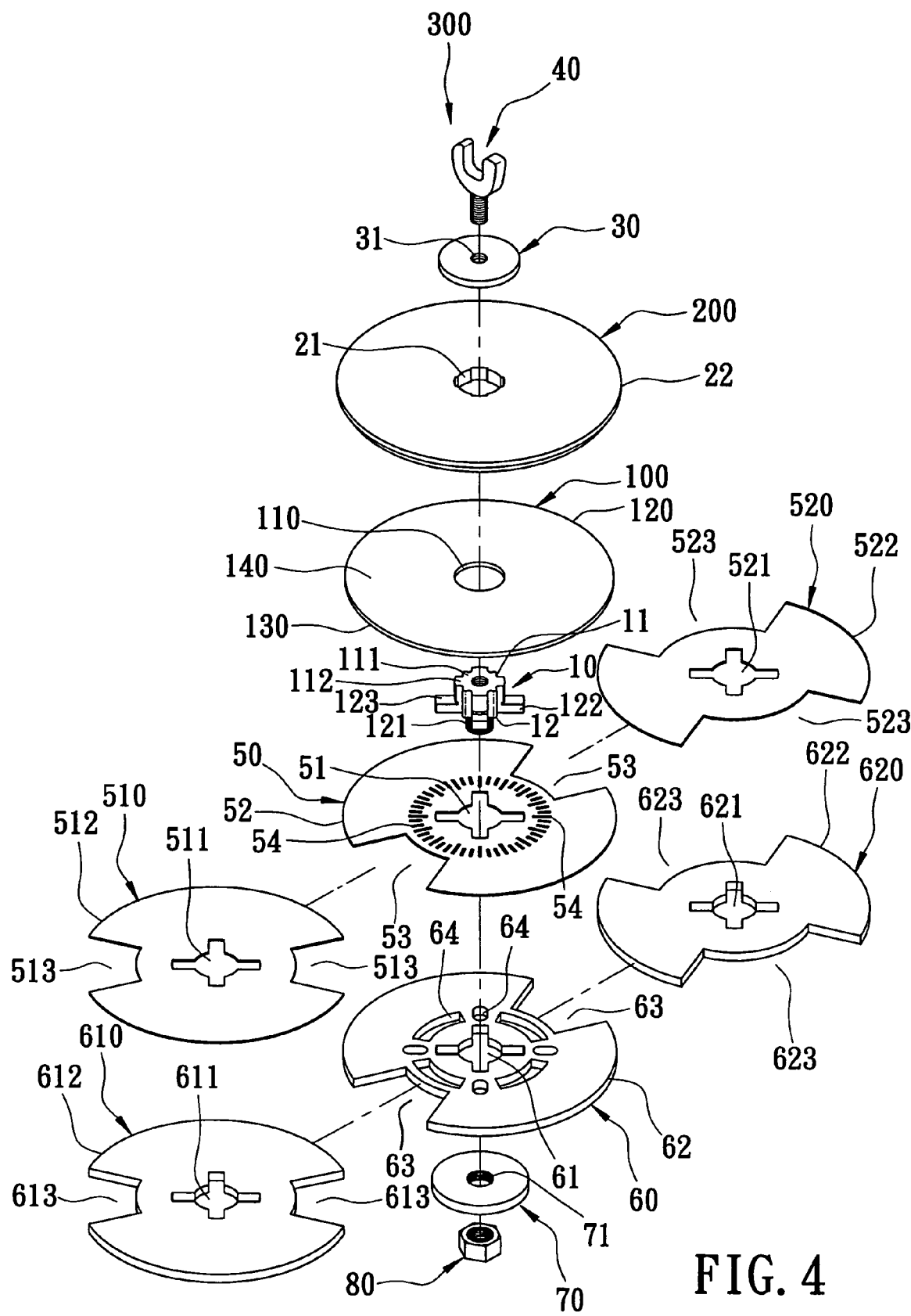
FIG. 4 is an exploded perspective view of the preferred embodiment of an apparatus for making a color filter according to the present invention.
Figure 6:
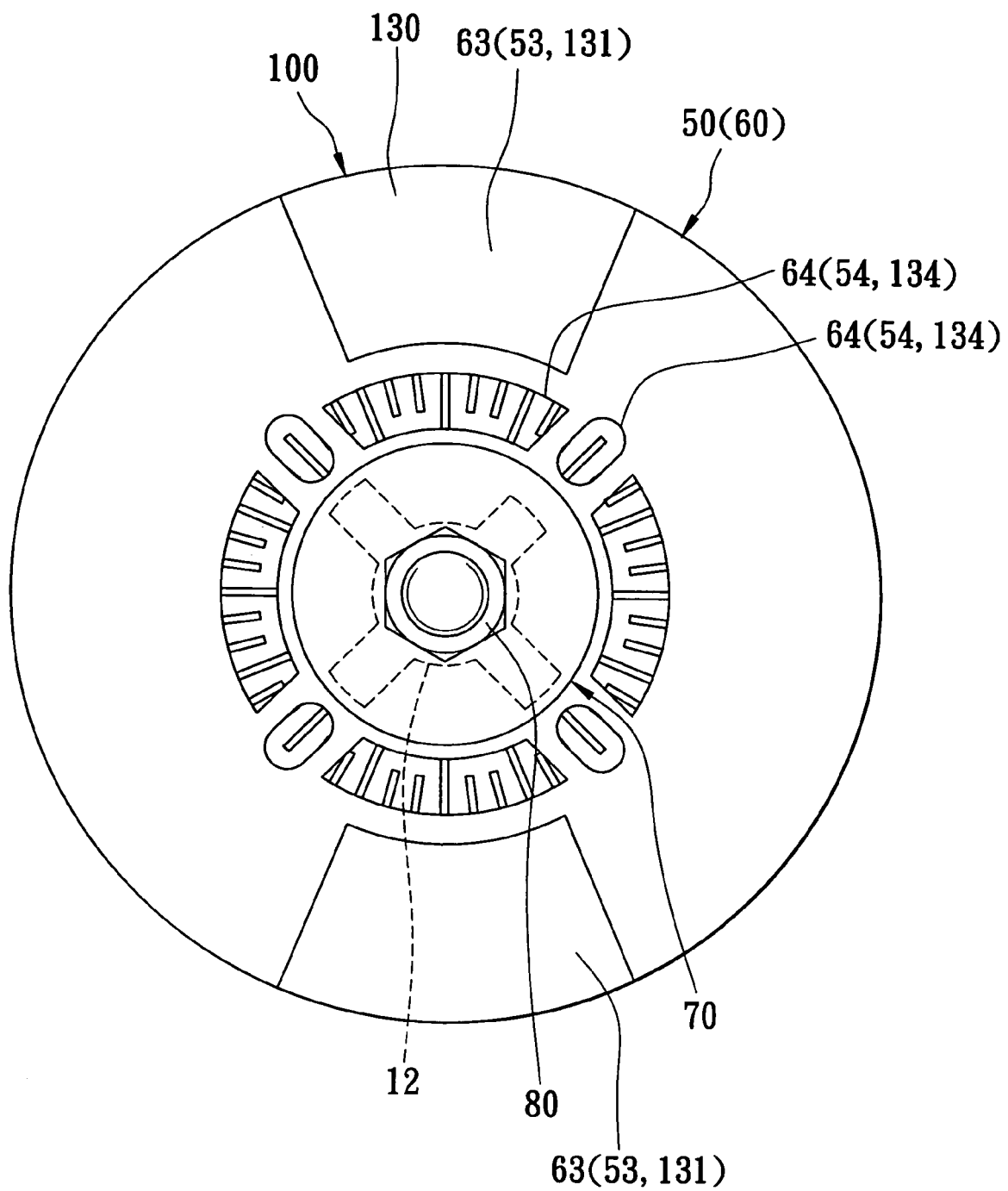
FIG. 6 is a schematic bottom view of FIG. 5, illustrating a first pair of first and second masking plates stacked on a substrate.

The operating procedures and steps for forming the colored segments 131, 132, 133 of the color filter 400 using the apparatus of the present invention are as follows:

1. Referring to FIGS. 4 to 6, the substrate 100 and the press plate 20 are first sleeved successively on the first positioning section 11 of the positioning post 10, after which the bolt 40 is passed through the screw hole 31 in the first packing ring 30, and engages threadedly the internally threaded hole 111 in the first positioning section 11 of the positioning post 10. The substrate 100, the press plate 200, and the first packing ring 30 are fixed on the first positioning section 11 of the positioning post 10 at this time, and the first surface 130 of the substrate 100 abuts tightly against the abutment surfaces 123 of the aligning protrusions 122 of the second positioning section 12. Then, the first and second masking plates 50, 60 are sleeved successively on the aligning protrusions 122 of the second positioning section 12 so as to be stacked on the substrate 100, followed by the passage of the externally threaded part 121 of the second positioning section 12 through the screw hole 71 in the second packing ring 70 so as to engage the nut 80 threadedly such that the first and second masking plates 50, 60 and the second packing ring 70 are fixed on the second positioning section 12 of the positioning post 10. The first masking plate 50 abuts tightly against the first surface 130 of the substrate 100 at this time. Through a color processing carried out by vapor deposition, coloring films are deposited directly on parts of the first surface 130 exposed respectively through the second and first cutout parts 63, 53, the slots 64, and the graduation holes 54. The first surface 130 of the substrate 100 is thus formed with two colored segments 131 and graduation marks 134, as best illustrated in FIG. 6. In this embodiment, the color of the colored segments 131 and the graduation marks 134 is blue (B) (see FIG. 9).

Figure 7:
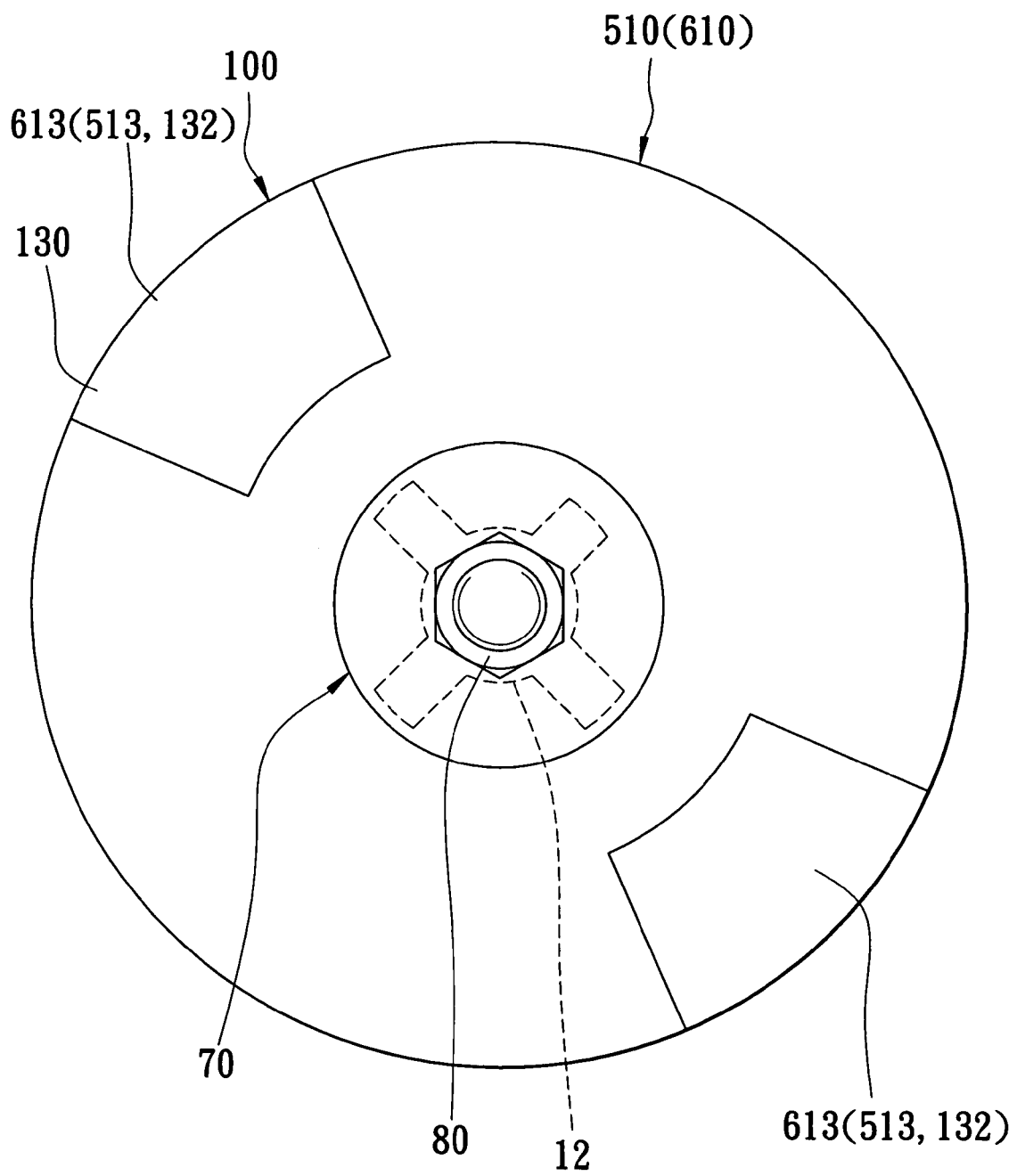
FIG. 7 is a view substantially similar to FIG. 6, illustrating a second pair of the first and second masking plates stacked on the substrate.

2. After Step 1, the first and second masking plates 50, 60 are removed from the second positioning section 12 of the positioning post 10 by loosening the nut 80, after which the first and second masking plates 510, 610 are sleeved on the second positioning section 12. The externally threaded part 121 of the second positioning section 12 passes through the first and second positioning holes 511, 611, and the screw hole 71 in the second packing ring 70 so as to engage threadedly the nut 80, thereby pressing the first masking plate 510 tightly against the first surface 130 of the substrate 100. Afterwards, through the color processing carried out by vapor deposition, coloring films are deposited directly on parts of the first surface 130 exposed respectively through the second and first cutout parts 613, 513. The first surface 130 is thus formed with two colored segments 132, as best shown in FIG. 7. In this embodiment, the color of the colored segments 132 is red (R) (see FIG. 9).

Figure 8:
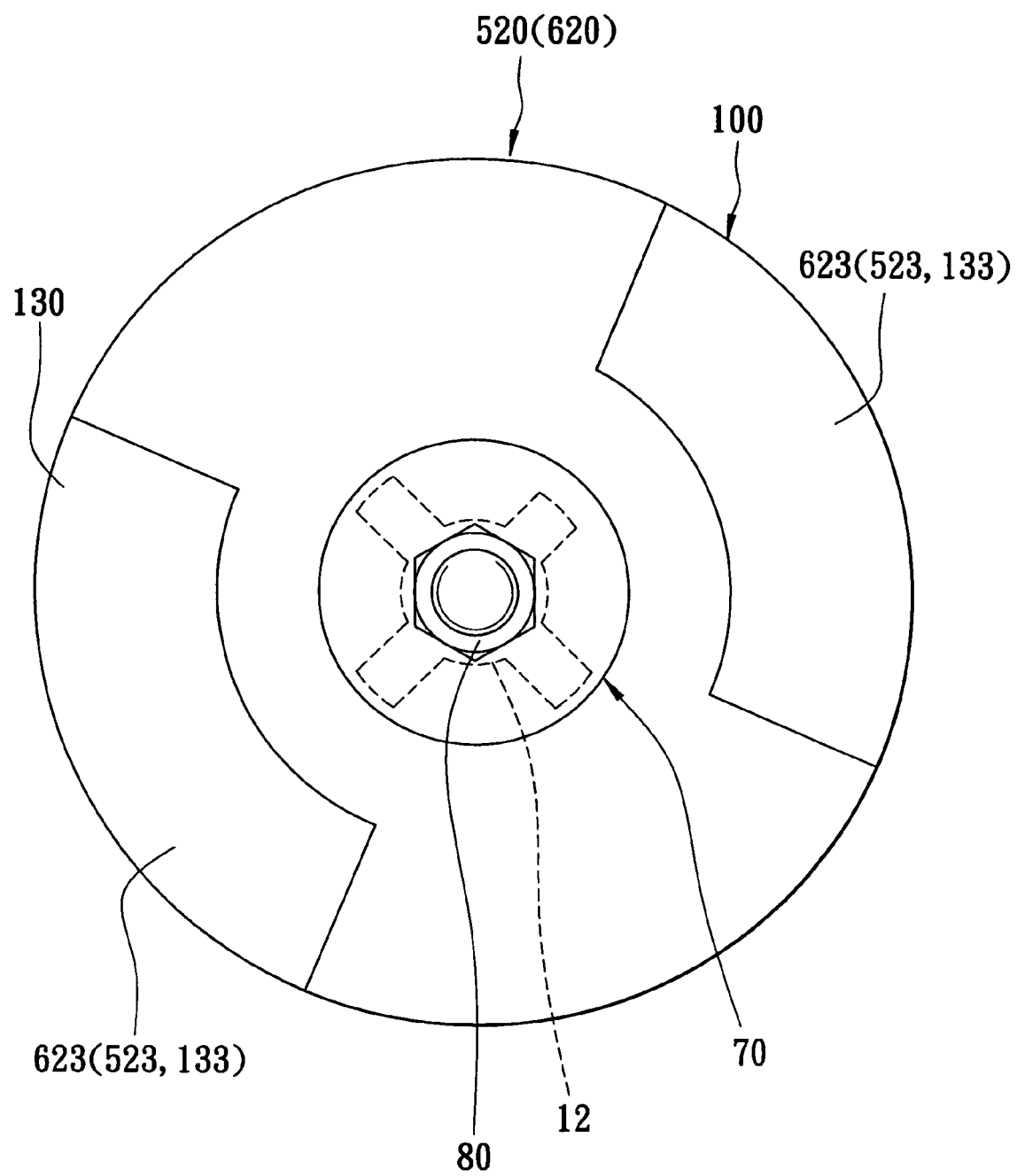
FIG. 8 is a view substantially similar to FIG. 6, illustrating a third pair of each of the first and second masking plates stacked on the substrate.

3. After Step 2, the first and second masking plates 510, 610 are removed from the second positioning section 12 of the positioning post 10 by loosening the nut 80, after which the first and second masking plates 520, 620 are sleeved on the second positioning section 12. The externally threaded part 121 of the second positioning section 12 passes through the first and second positioning holes 521, 621, and the screw hole 71 in the second packing ring 70 so as to engage threadedly the nut 80, thereby pressing the first masking plate 520 tightly against the first surface 130 of the substrate 100. Afterwards, through the color processing carried out by vapor deposition, coloring films are deposited directly on the parts of the first surface 130 exposed respectively through the second and first cutout parts 623, 523. The first surface 130 is thus formed with two colored segments 133, as best shown in FIG. 8. In this embodiment, the color of the colored segments 133 is green (G) (see FIG. 9).

Figure 9:
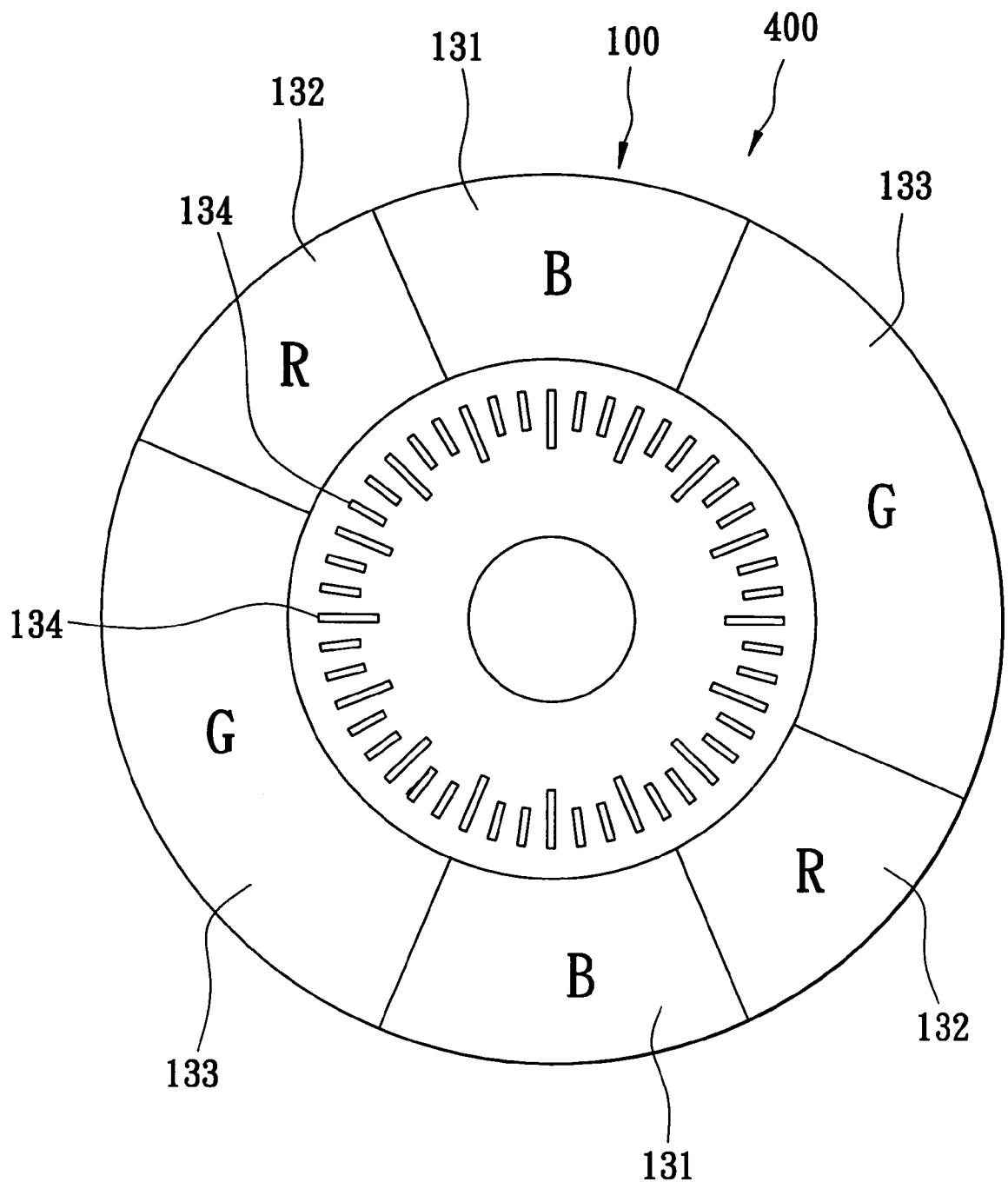
FIG. 9 is a schematic view of a unitary color filter produced according to the apparatus of the preferred embodiment.

Referring to FIG. 9, after the deposition of the coloring films on the first surface 130 of the substrate 100 through the use of the first and second masking plates 50, 510, 520, 60, 610, 620, the first surface 130 of the substrate 100 is formed with the alternating colored segments 131, 132 and 133, which cooperate to define an annulus, and the graduation marks 134, thereby forming a unitary color filter 400 having three colors.

The advantages of the present invention can be summarized as follows:

1. Through direct deposition of the coloring films on the exposed parts of the first surface 130 of the substrate 100, the first surface 130 may be formed with alternating colored segments 131, 132 and 133, thereby producing a three-colored unitary color filter 400. As compared to the conventional technical method, which requires six individual filter segments 104 that are colored separately and that are combined to form a ring-shaped filter disc, using the apparatus of the present invention to form the three-colored unitary color filter 400 is not only simple and convenient, but can enhance production rate as well. Moreover, production efficiency is increased, and product stability and accuracy are high.

2. Since the first masking plates 50, 510, 520 are made by chemical etching, they can have a thickness ranging from 0.1 mm~0.3 mm, and are thus flexible. Furthermore, since the second masking plates 60, 610, 620 are rigid, they can press the first masking plates 50, 510, 520 tightly against the first surface 130 of the substrate 100. Thus, when different coloring materials are passed through the first cutout parts 53, 513, 523 and are deposited on the first surface 130, due to tight contact of the first masking plates 50, 510, 520 with the first surface 130, the coloring materials deposited on each exposed region of the first surface 130 are prevented effectively from spreading to adjacent regions of the first surface 130.

3. Since the first masking plates 50, 510, 520 are made by chemical etching and can be made with a surface roughness of less than 0.02 μm, when the first masking plates 50, 510, 520 abut tightly against the first surface 130, the first masking plates 50, 510, 520 do not wear out the first surface 130 of the substrate 100.

4. Since the first masking plates 50, 510, 520 are made by chemical etching, each cutout part 53, 513, 523 of the first masking plates 50, 510, 520 can subtend an angle at the center of the respective one of the first masking plates 50, 510, 520 with the angle having a relatively small tolerance of ±0.1°. Through the first cutout parts 53, 513, 523, the first surface 130 of the substrate 100 can be formed with precise colored segments 131, 132, 133 at respective positions, and incidence of clearance formation or an overlap between adjacent colored segments 131, 132, 133 can be prevented.

5. Since the cross-section of the second positioning section 12 is asymmetric, and since the cross-section of each of the positioning holes 51, 511, 521, 61, 611, 621 in the first and second masking plates 50, 510, 520, 60, 610, 620 substantially corresponds to that of the second positioning section 12, misalignment during assembly of the first and second masking plates 50, 510, 520, 60, 610, 620 can be avoided. If a mechanism to ensure accurate positions of the first and second masking plates 50, 510, 520, 60, 610, 620 during assembly is not provided, deposition of the coloring films on the first surface 130 can result in incorrect positions of the colored segments 131, 132, 133.

6. The groove 1121 formed between each of the positioning protrusions 112 and the abutment surface 123 of a respective one of the aligning protrusions 122 can reduce contact area between the positioning protrusions 112 and the edge of the substrate 100 defining the central slot 110. As such, the substrate 100 will not crack about the central slot 110 due to thermal expansion of the positioning protrusions 112 when heated during color processing.

7. The second masking plates 60, 610, 620 can cover the first masking plates 50, 510, 520 aside from supporting the same, such that during color processing, the first masking plates 50, 510, 520 will not deform due to accumulation of film layers.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An apparatus for use in forming colored segments of a color filter on a substrate having a central slot, an outer periphery around the central slot, a first surface which extends between the central slot and the outer periphery and which is coated with the colored segments, and a second surface opposite to the first surface, said apparatus comprising:
    at least one pair of first and second masking plates, said first masking plate being adapted to overlie the first surface, said first masking plate having a first positioning hole, a first outer periphery corresponding to the outer periphery of the substrate, and at least one first cutout part adapted to expose a portion of the first surface, said second masking plate having a second positioning hole, a second outer periphery corresponding to said first outer periphery, and at least one second cutout part corresponding to said first cutout part; and
    a securing device for securing together said first and second masking plates and the substrate, said securing device passing through the central slot and said first and second positioning holes, and aligning said first and second cutout parts,
    whereby said second masking plate presses said first masking plate tightly against the substrate.

2. The apparatus as claimed in claim 1, further comprising a press plate having an axial hole and an outer periphery corresponding to the outer periphery of the substrate, said press plate being adapted to abut against the second surface of the substrate and being sleeved on said securing device.

3. The apparatus as claimed in claim 2, wherein said securing device includes:
    a positioning post having a first positioning section and a second positioning section extending axially and outwardly from said first positioning section, said second positioning section having an abutment surface connected to and extending transversely and outwardly from said second positioning section adjacent to said first positioning section, the first surface of the substrate abutting against said abutment surface and the substrate being sleeved on said first positioning section, said first masking plate being adapted to abut against the first surface of the substrate and being sleeved on said second positioning section, said second masking plate abutting against said first masking plate and being sleeved on said second positioning section;
    a first fastening member engaging said first positioning section so as to press said press plate against the second surface of the substrate; and
    a second fastening member engaging said second positioning section so as to press said first masking plate against the first surface of the substrate.

4. The apparatus as claimed in claim 3, wherein said first fastening member is a bolt.

5. The apparatus as claimed in claim 4, wherein said securing device further includes a first packing ring disposed between said press plate and said bolt and having a central screw hole, said bolt passing through said central screw hole and engaging threadedly said first positioning section so as to press said first packing ring toward the substrate so that said press plate is pressed against the substrate.

6. The apparatus as claimed in claim 3, wherein said second fastening member is a nut.

7. The apparatus as claimed in claim 6, wherein said securing device further includes a second packing ring disposed between said second masking plate and said nut and having a central screw hole, said second positioning section having an externally threaded part passing through said first and second positioning holes in said first and second masking plates and said central screw hole in said second packing ring so as to engage said nut, said nut pressing said second packing ring toward the substrate so that said first masking plate is pressed against the substrate.

8. The apparatus as claimed in claim 3, wherein said first positioning section includes an internally threaded hole, a plurality of angularly spaced-apart positioning protrusions that extend outwardly and radially from said first positioning section, and a groove defined between each of said positioning protrusions and said abutment surface of said second positioning section.

9. The apparatus as claimed in claim 1, comprising three pairs of said first and second masking plates.

10. The apparatus as claimed in claim 9, wherein each of said first masking plates has a pair of said first cutout parts that are diametrically opposite, each of said second masking plates having a pair of said second cutout parts that are aligned respectively with said first cutout parts.

11. The apparatus as claimed in claim 3, wherein said second positioning section has an asymmetric cross-section, each of said first and second positioning holes having a cross-section substantially corresponding to that of said second positioning section.

12. The apparatus as claimed in claim 11, wherein said second positioning section includes a plurality of angularly spaced-apart aligning protrusions extending outwardly and radially from said second positioning section, the length of at least one of said aligning protrusions being different from those of the other ones of said aligning protrusions, said first masking plate and said second masking plate being sleeved on said aligning protrusions to stack on the substrate when said second positioning section is passed through said first and second positioning holes.

13. The apparatus as claimed in claim 1, wherein said first masking plate further has a plurality of annularly spaced-apart graduation holes surrounding said first positioning hole, said second masking plate further having a plurality of slots to be in alignment with said graduation holes, whereby graduation marks can be formed on the first surface of the substrate.

14. The apparatus as claimed in claim 1, wherein said first masking plate is flexible, and said second masking plate is rigid.

15. The apparatus as claimed in claim 14, wherein said first masking plate has a thickness ranging from 0.1~0.3 mm.

16. The apparatus as claimed in claim 14, wherein said first masking plate is made by chemical etching.

17. The apparatus as claimed in claim 1, wherein said first masking plate is made of metal.

18. The apparatus as claimed in claim 17, wherein said metal is stainless steel.

19. The apparatus as claimed in claim 16, wherein said first masking plate has a surface roughness of less than 0.02 $\mu$m.

20. The apparatus as claimed in claim 16, wherein said first cutout part subtends an angle at the center of said first masking plate, the tolerance of said angle being ±0.1°.

* * * * *